(12) United States Patent
Miura et al.

(10) Patent No.: US 7,559,435 B2
(45) Date of Patent: Jul. 14, 2009

(54) NUT FEEDER

(75) Inventors: Masaaki Miura, Hiroshima (JP); Kouji Sakota, Hiroshima (JP); Seji Miura, Hiroshima (JP)

(73) Assignee: Seki Kogyo Co., Ltd., Hiroshima (JP)

( * ) Notice: Subject to any disclaimer, the term of this patent is extended or adjusted under 35 U.S.C. 154(b) by 1170 days.

(21) Appl. No.: 10/879,748

(22) Filed: Jun. 30, 2004

(65) Prior Publication Data

US 2005/0056683 A1    Mar. 17, 2005

(30) Foreign Application Priority Data

Sep. 16, 2003    (JP) ............................. 2003-323131

(51) Int. Cl.
*B65H 3/48* (2006.01)
(52) U.S. Cl. ...................... 221/213; 221/268; 221/278; 222/373; 198/468.4; 294/64.3; 901/40
(58) Field of Classification Search ................. 414/737; 901/40; 294/64.3; 198/468.4; 221/213, 221/236, 268, 278; 222/373
See application file for complete search history.

(56) References Cited

U.S. PATENT DOCUMENTS 5,895,584 A * 4/1999 Sakota ..................... 219/86.24
6,874,655 B2 * 4/2005 Aoyama et al. ............. 221/213

FOREIGN PATENT DOCUMENTS

| JP | 57007825 | 2/1982 |
| JP | 570077825 | 2/1982 |
| JP | 10-43870 | 2/1998 |
| JP | 2002-321064 | 11/2002 |

OTHER PUBLICATIONS

"Notice of Reasons for Restrictions" No. 2004-205102 dated Oct. 2, 2007 from the Japanese Patent Office (with Translation).
Toshiro Kanazawa, "Notice of Reasons for Rejection", JP2004-205102, Oct. 2, 2007.

* cited by examiner

*Primary Examiner*—Michael S Lowe
(74) *Attorney, Agent, or Firm*—Studebaker & Brackett PC; Donald R. Studebaker

(57) ABSTRACT

The forward movement of a feed rod 15 of a nut feeder permits pressurization of air in an air chamber 3*a* defined in a rod holder 3, thereby blowing the air out of the air outlet 20 through an air inlet 21 and an air passage 22. A nut 7 is held on the feed rod 15 by the pressure of the air blow from the air outlet 20.

4 Claims, 6 Drawing Sheets

NUT FEEDER

BACKGROUND OF THE INVENTION (1) Field of the Invention

The present invention relates to a nut feeder for feeding nuts to nut resistance welding equipment and broadly to a nut feeder for feeding nuts to a predetermined position.

(2) Description of Related Art

Japanese Unexamined Patent Publication No. 2002-321064 shows an example of nut feeders for feeding nuts to nut resistance welding equipment. In this nut feeder, a push rod is provided at its front end with a nut support pin and connected to the front end of a rod of an air pressure cylinder serving as an actuator. The push rod is placed in a rod holder concentrically attached to the front end of the actuator. The pushing operation of the air pressure cylinder moves the push rod forward to thereby feed to the target position of a workpiece a nut held by the support pin at the front end of the push rod.

However, since in the above-described nut feeder the air pressure cylinder is used as the actuator, an air compressor for feeding air needs to be installed in a factory. In this case, enormous amounts of electric power are consumed to operate the compressor, and air piping in the factory becomes complex. In addition, sounds resulting from the air compressor and other pneumatic equipment provide noises, leading to the deterioration in working environment.

To cope with this, in recent years, electric cylinders have been used as actuators as described above to attempt to save energy and reduce noises.

Meanwhile, the present inventors have invented and put into practice use an apparatus and a method for blowing air out of the front end of a nut feed rod toward a nut to hold the nut on the rod using the air pressure in order to prevent the nut from accidentally dropping off the front end of the nut feed rod, as described in Japanese Laid-Open Patent Publication No. 10-43870.

Hence, removal of the air compressor from the factory would preclude the application of nut holding means utilizing this kind of air pressure. This makes it difficult to save energy totally in the factory.

SUMMARY OF THE INVENTION

An object of the present invention is to provide a nut feeder which can certainly hold a nut on a rod and feed the nut to the target position without externally supplying air by an air compressor or the like.

According to the present invention, an air chamber is formed in a rod holder into which a nut feed rod is inserted to change its volume in accordance with the forward/backward movement of the rod, and a nut is held on the rod by utilizing the air in the air chamber.

More particularly, in the present invention, a nut feeder comprises: a cylindrical rod holder; a rod inserted into the rod holder and including at its front end a nut holding part insertable into the hole of a nut, said rod being constructed so as to be driven into forward and backward movement by an actuator; a nut stopper, provided at the front end of the rod holder, for supporting a nut coaxially with the rod and for permitting the forward feed of the nut when the nut holding part is inserted into the nut hole and subsequently pushes forward the nut stopper by the forward movement of the rod; a piston provided on the rod to slide on the inner periphery of the rod holder; and a seal for airtightly inserting a part of the rod located forward of the piston into the rod holder, said seal being provided on the inner periphery of the front end of the rod holder, wherein in the rod holder, an air chamber is formed which is defined at the front and back ends by the seal and the piston, respectively, and changes its volume in accordance with the forward/backward movement of the rod, the rod is formed with an air outlet provided at the front end section of the nut holding part to blow air to the nut carried on the nut holding part against dropping off of the nut from the nut holding part, an air inlet provided backward of the nut holding part to connect with the air chamber, and an air passage connecting the air outlet and the air inlet, and the forward movement of the rod allows the air in the air chamber to be pressurized by the piston to blow the pressurized air to the nut carried on the nut holding part, and then allows the nut to be fed as being held on the nut holding part by the air blow to the nut.

Therefore, according to the present invention, the forward movement of the rod allows the air in the air chamber defined in the rod holder to be blown out of the air outlet through the air inlet and the air passage to the nut, thereby holding the nut on the nut holding part. This eliminates the need for externally supplying air using an air compressor or the like, resulting in no need to provide the air compressor or air piping in the factory. This makes it possible to save energy and reduce noises and is also advantageous in reducing the cost of spending on equipment for the factory.

In the preferred embodiment, the rod may be composed of a drive rod driven by the actuator and a feed rod connected to the front end of the drive rod; the nut holding part may be provided at the front end of the feed rod; the piston may be provided on the feed rod or between the feed rod and the drive rod; a block including a nut holding chamber connected to the inside of the rod holder may be provided at the front end of the rod holder; the block may be formed with a supply opening for supplying nuts into the nut holding chamber and a delivery opening for delivering each said nut from the nut holding chamber; and the nut stopper may be provided on the block to normally close the delivery opening and, when pushed by the feed rod, open the delivery opening and permit the nut to be fed.

Preferably, the nut holding part of the rod may include a small-diameter section located at the front end thereof and insertable into the hole of a nut and a large-diameter section connecting to the small-diameter section and having a larger diameter than the hole of a nut, and may be formed with the air outlet at the front end of the small-diameter section, and the nut feeder is constructed to blow air to a nut carried on the nut holding part through the air outlet so that the nut is pressed against a shoulder between the small-diameter section and the large-diameter section.

Therefore, the nut can be held without complicating the shape of the nut. This is advantageous in reducing cost.

Furthermore, preferably, when the nut held on the nut holding part is fed to a predetermined nut feeding position by the forward movement of the rod, the air inlet may be placed so as to be blocked by the seal to stop air from blowing out of the air outlet.

Therefore, without the provision of any separate stop means, such as a sensor for detecting the position where the rod moves forward and a switch, air blow from the air outlet can be stopped. Therefore, a nut feeder can be constructed with a simple mechanism. This is advantageous in reducing the cost of spending on equipment.

Moreover, preferably, in the rod holder, an air blow chamber may be formed which is separated from the air chamber by the piston and change its volume in accordance with the forward/backward movement of the rod, and an air blow pipe may extend from the air blow chamber to blow air to the site where the nut is to be welded during the retraction of the rod.

Therefore, by utilizing the backward movement of the rod, air can be blown through the air blow chamber inside the rod holder and the air blow pipe to the site where the nut is to be welded. The air blow can thereby remove spatters produced in nut resistance welding. This eliminates the need for separately preparing air blow means to remove the spatters and is advantageous in reducing the cost of spending on equipment and saving energy.

DETAILED DESCRIPTION OF THE INVENTION

An embodiment of the present invention will be described hereinafter with reference to the drawings.

<Nut Feeder Structure>

Figure 1:
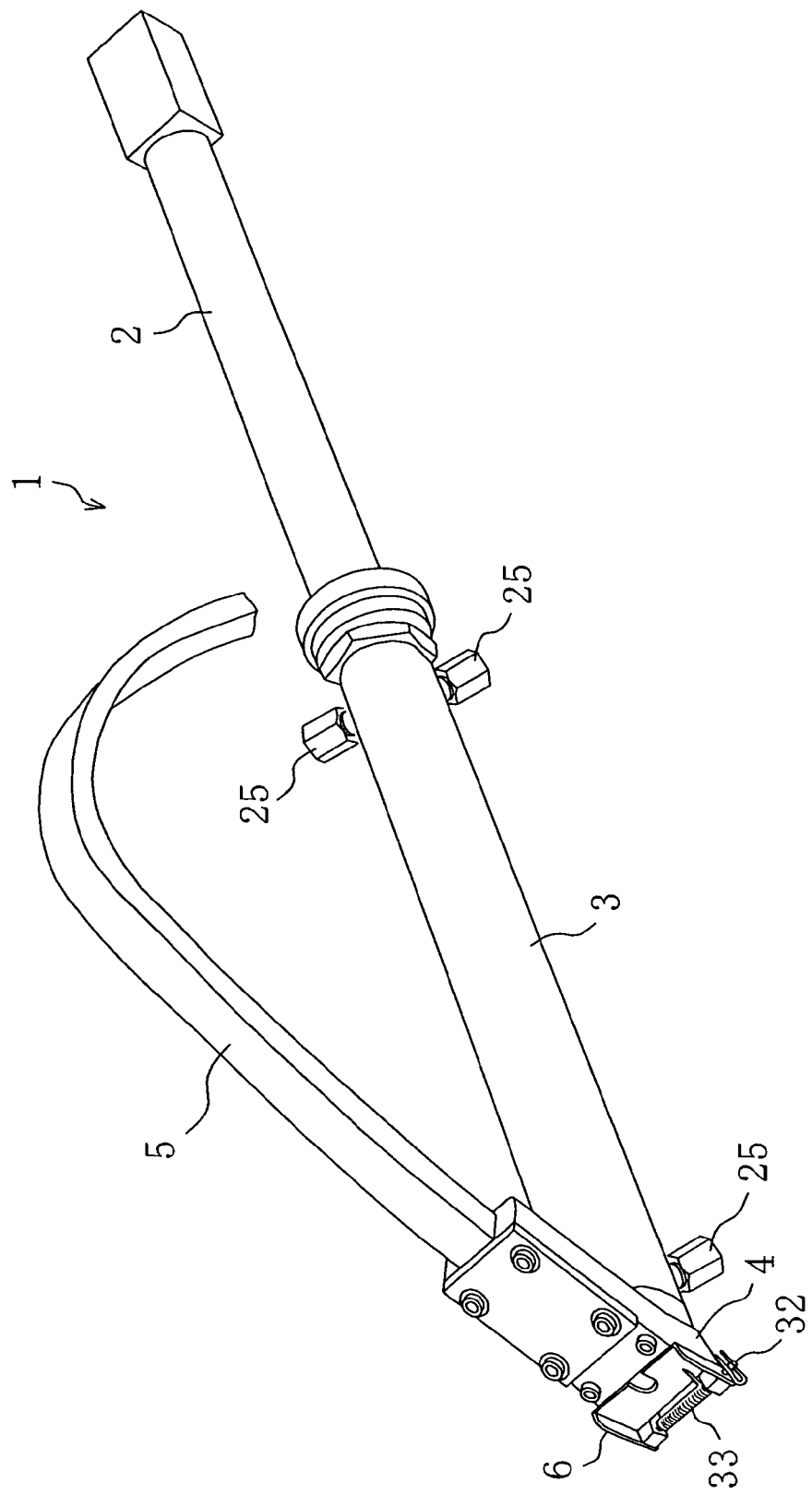
FIG. 1 is a perspective view showing a nut feeder according to an embodiment of the present invention.
Figure 2:
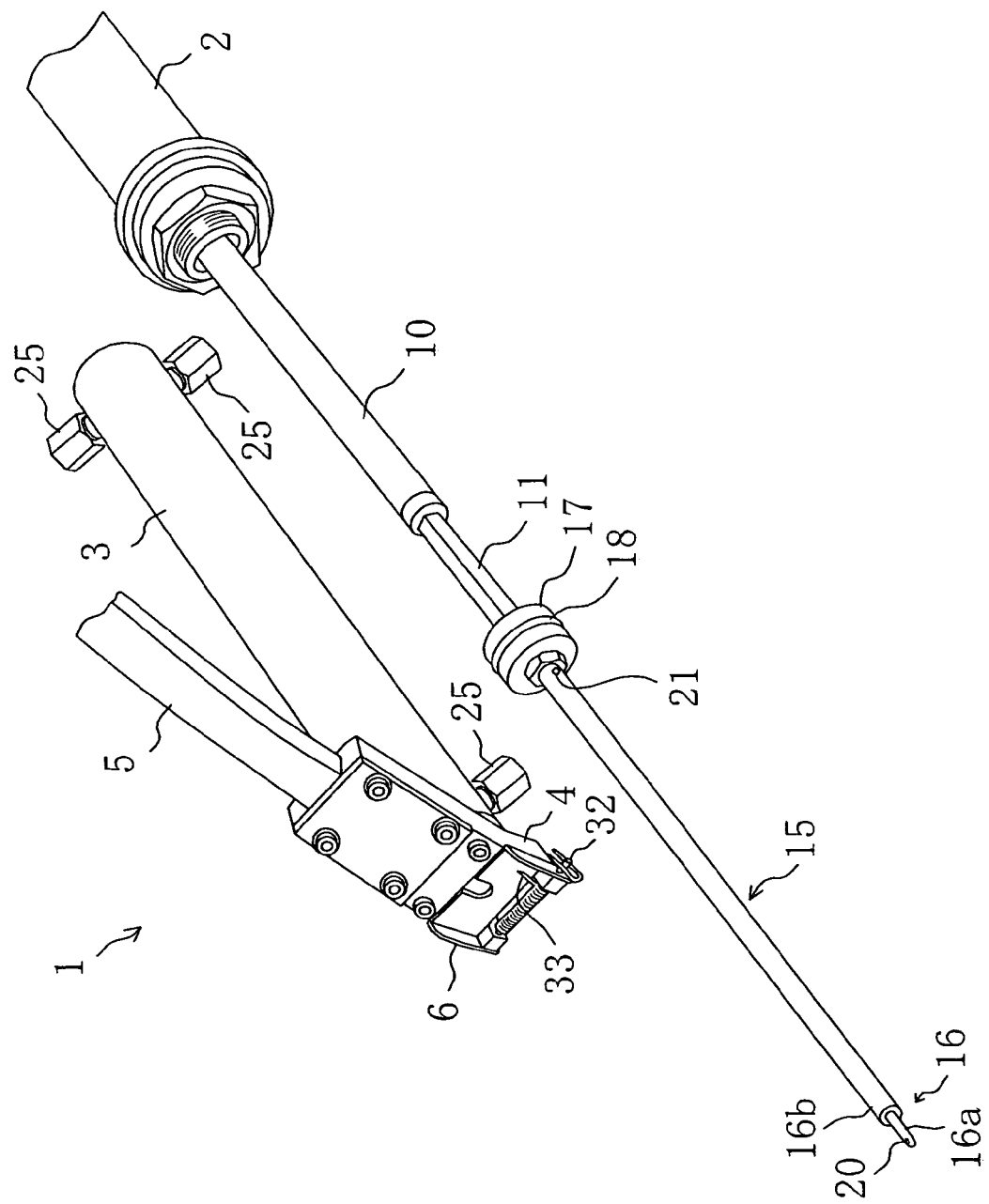
FIG. 2 is an exploded perspective view showing the nut feeder according to the embodiment of the present invention.

FIG. 1 shows a nut feeder 1 according to this embodiment, and FIG. 2 is an exploded view of the nut feeder 1.

The nut feeder 1 comprises an electric cylinder (actuator) 2 including a drive rod 10 moving forward and backward in the axis direction, a cylindrical rod holder 3 concentrically attached to the front end of the electric cylinder 2, a block 4 that is provided on the front end of the rod holder 3 and holds nuts 7 (shown in FIG. 3), a supply tube 5 for supplying nuts 7 into the block 4, and an opening/closing door (nut stopper) 6 for opening/closing a delivery opening 34 of the block 4 described later.

Figure 3:
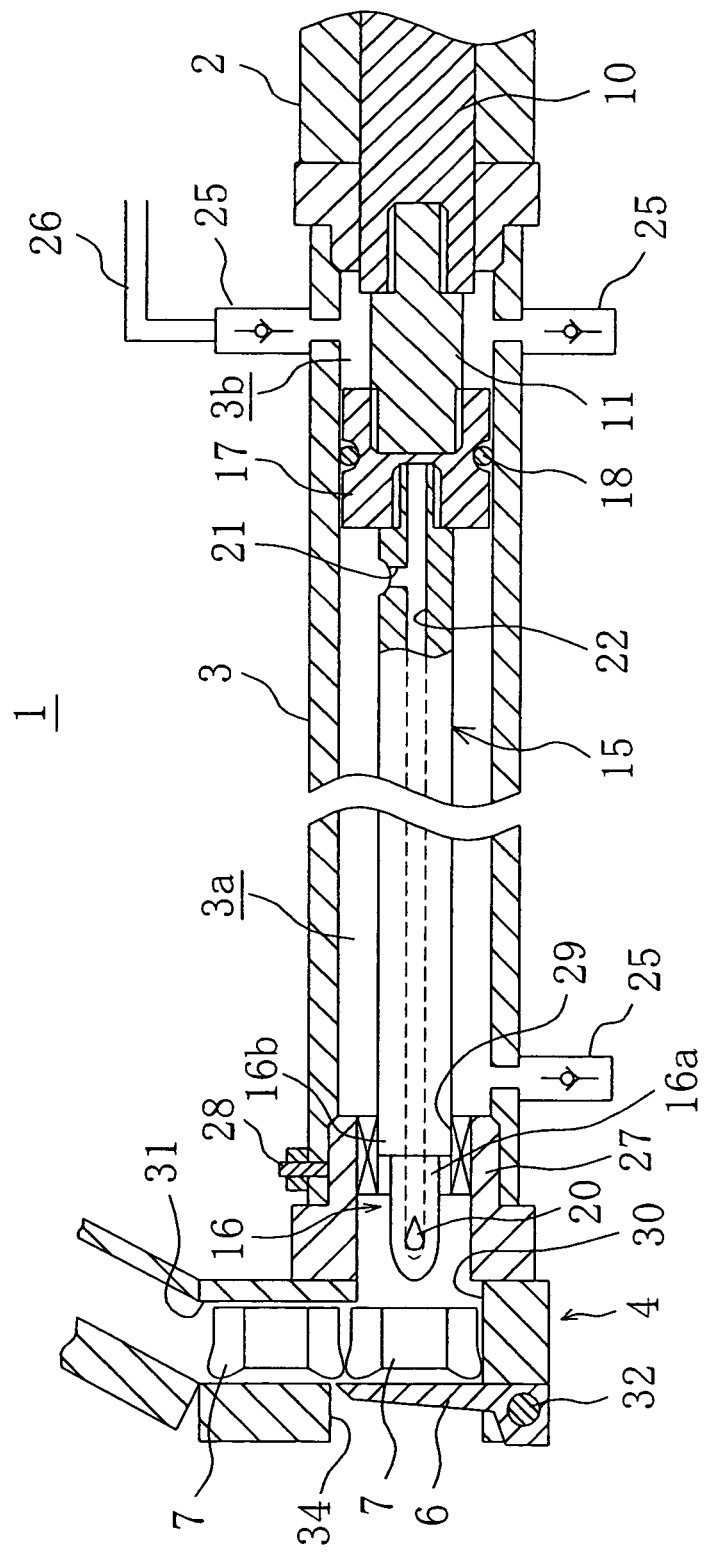
FIG. 3 is a cross-sectional view showing the nut feeder according to the embodiment of the present invention.

As shown in FIG. 3, female threads are formed at the front end of the drive rod 10 of the electric cylinder 2. These female threads are screwed into the back end of a tie rod 11, both ends of which are formed with male threads. The male threads at the front end of the tile rod 11 are screwed onto the back end of a feed rod 15.

A nut holding part 16 is provided at the front end of the feed rod 15 to hold a nut 7, and includes a small-diameter section 16a through which the hole of a nut 7 is passed and a large-diameter section 16b that is larger than the nut hole. The small-diameter section 16a and the large-diameter section 16b are formed to align in the direction along which the feed rod 15 moves forward/backward. Furthermore, a piston 17 is provided between the feed rod 15 and the drive rod 10 to airtightly slide on the inner periphery of the rod holder 3.

The periphery of the piston 17 is formed with a circumferential groove generally in the axial middle of the piston 17 generally in the axial middle of the piston 17. An O ring 18 is fitted into this groove. This O ring 18 fills the gap between the inner wall of the rod holder 3 and the piston 17. In this manner, the air in the rod holder 3 can be pushed out with the forward/backward movement of the feed rod 15 in the rod holder 3. Applicable materials for the O ring 18 include rubber and silicon.

If the inner diameter of the rod holder 3 has generally the same value as the outer diameter of the piston 17 on the back end of the feed rod 15, the O ring 18 can be saved.

Figure 4:
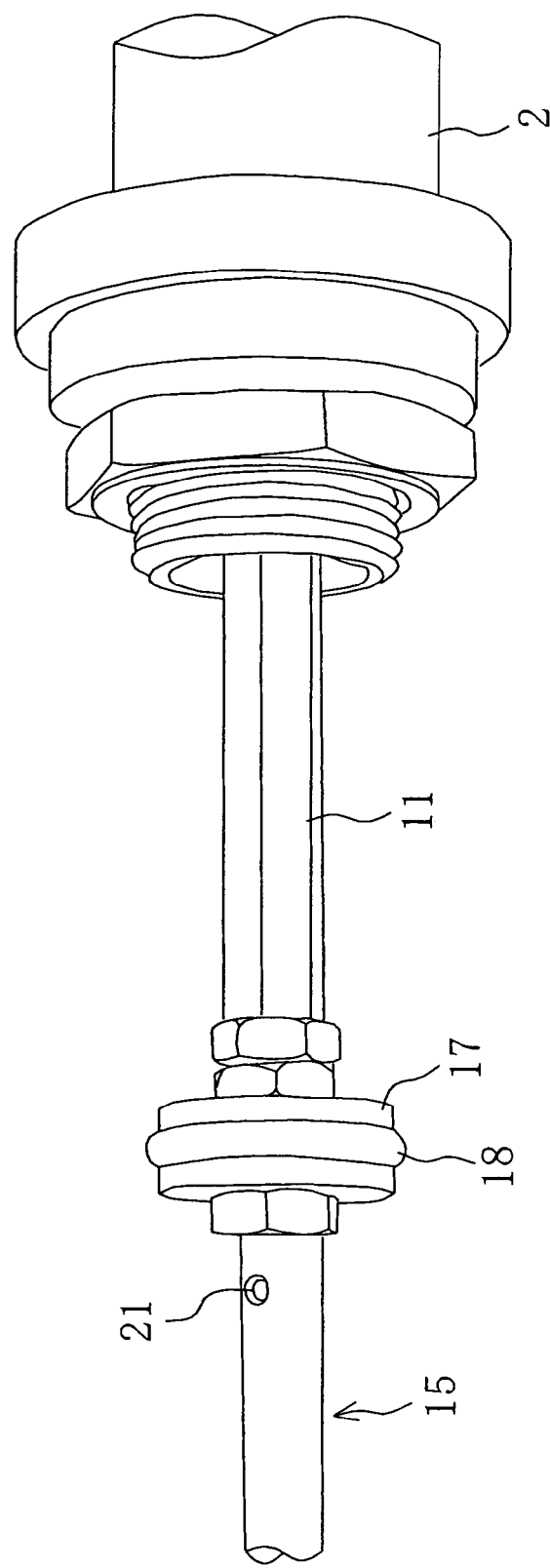
FIG. 4 is a side view showing the periphery of an air inlet of a feed rod according to the embodiment of the present invention.

An air outlet 20 is open at the front end of the small-diameter section 16a of the nut holding part 16 of the feed rod 15. An air inlet 21 is open at the back end of the feed rod 15 as also shown in FIG. 4. An air passage 22 is formed inside the feed rod 15 so as to be connected at one end to the air inlet 21 and at the other end to the air outlet 20. The air outlet 20 may comprise a plurality of outlets circumferentially spaced from each other around the axis of the small-diameter section 16a of the nut holding part 16.

A pressure-regulating valve 25 is attached to the front end of the rod holder 3 to regulate the air pressure inside the rod holder 3. Furthermore, two pressure-regulating valves 25 and 25 are attached to the back end of the rod holder 3, and one of them is connected to one end of an air blow pipe 26. An unshown air blower is connected to the other end of the air blow pipe 26.

A cylindrical rod guide 27 is coupled to the back end of the block 4 and fitted into the front end of the rod holder 3. A fixing bolt 28 is screwed into the rod holder 3 from its outer periphery toward its central axis. The end of the fixing bolt 28 is pressed against the outer periphery of the rod guide 27, whereby the block 4 is coupled to the rod holder 3. Furthermore, a fixing nut is screwed onto the fixing bolt 28 to prevent the fixing bolt 28 from accidentally dropping off.

A bush (sealing member) 29 is inserted into the rod guide 27. The bush 29 allows the feed rod 15 to smoothly slide in the axis direction and airtightly move through the rod guide 27. Applicable materials for the bush 29 include resins and metals. Furthermore, in order to enhance the sealing property between the rod holder 3 and the feed rod 15, an O ring, instead of the bush 29, may be used at the same location.

In the rod holder 3, there are provided an air chamber 3a defined by the feed rod 15, the piston 17 and the bush 29, and an air blow chamber 3b defined by the drive rod 10, the tie rod 11, the piston 17 and the front end of the electric cylinder 2.

In the block 4, there are provided a nut holding chamber 30 for accommodating a nut 7, a supply opening 31 for supplying nuts 7 from side to the nut holding chamber 30, and a delivery opening 34 passing through the axis direction to deliver each nut 7 from the nut holding chamber 30. The nut holding chamber 30 is connected to the inside of the rod holder 3 through the cylindrical hole of the rod guide 27.

The supply tube 5 is connected at one end to the supply opening 31 of the block 4 as described above and at the other end to an unshown nut selector. Nuts 7 are properly oriented by the nut selector and fed through the supply tube 5 to the nut holding chamber 30 of the block 4.

The opening/closing door 6 is placed to block the delivery opening 34 of the block 4, attached rotatably about a pivot shaft 32 provided in the block 4, and supported thereto in a closed state biased by a kick spring 33.

Although in this embodiment the electric cylinder 2 is used as an actuator for feeding a nut 7 to the nut feeding position where each nut is to be fed, this is not restrictive. Various kinds of actuators, such as a servo motor, a stepping motor, a linear motor, a rack and gear type motor, and a fluid pressure cylinder, can be used instead.

In the nut feeder 1 of the present invention having the above structure, the electric cylinder 2 requiring no external air supply is used as an actuator that moves forward/backward to feed a nut 7 to the nut feeding position. This eliminates the need for externally supplying air using an air compressor or the like, resulting in no need to provide the air compressor or air piping in the factory. This makes it possible to save energy and reduce noises and is also advantageous in reducing the cost of spending on equipment for the factory.

<Nut Feeding Method>

A nut feeding method using the nut feeder 1 according to this embodiment will be described hereinafter.

As shown in FIG. 3, nuts 7 are properly oriented by an unshown nut selector and delivered to the supply tube 5 (shown in FIG. 1). The delivered nuts 7 are supplied one by one through the supply opening 31 of the block 4 of the nut feeder 1 to the nut holding chamber 30 and accommodated therein to allow the feed rod 15 to hold it.

Figure 5:
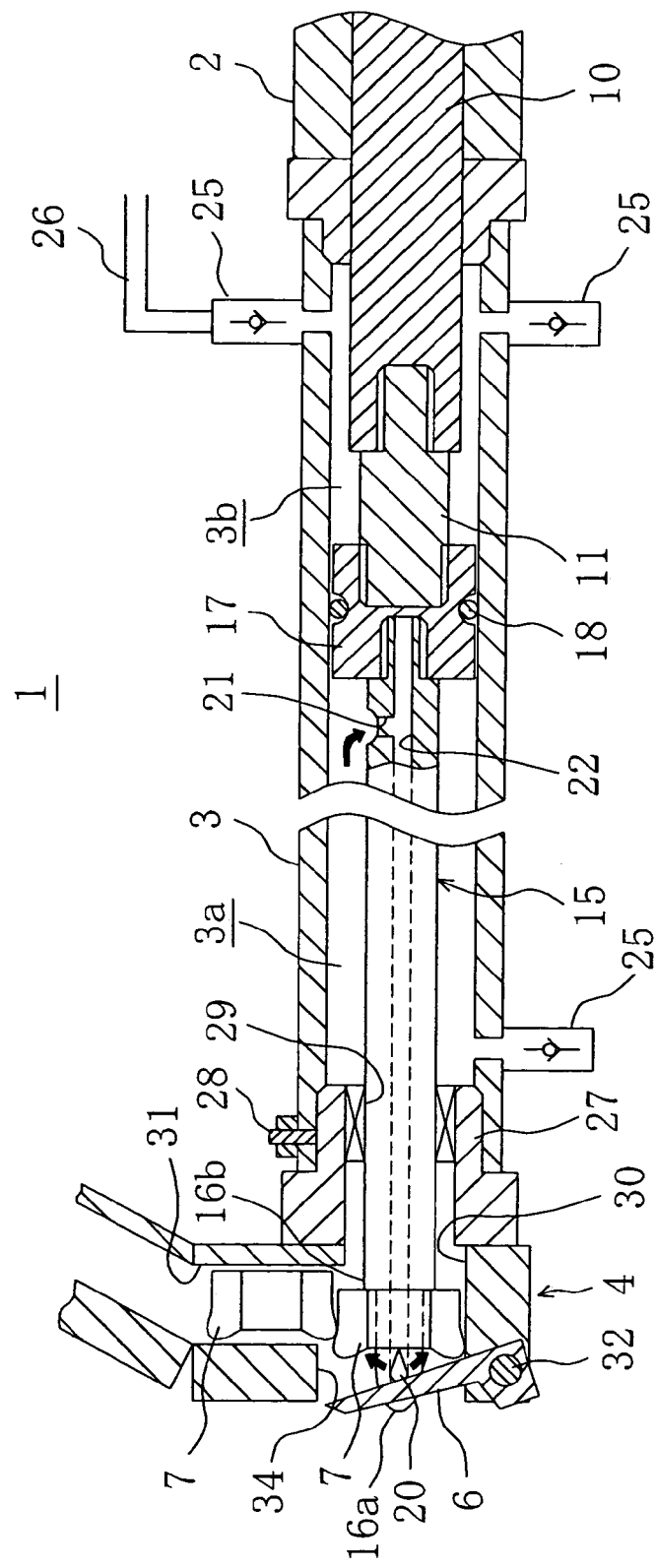
FIG. 5 is a cross-sectional view showing the state of the feed rod during its forward movement in the embodiment of the present invention.

As shown in FIG. 5, the drive rod 10 of the electric cylinder 2 is driven forward, and the small-diameter section 16a of the nut holding part 16 of the feed rod 15 coupled to the drive rod 10 is inserted into the hole of the supplied nut 7. With the nut 7 inserted on the small-diameter section 16 of the feed rod 15, the front end of the feed rod 15 is moved forward while being pressed against the opening/closing door 6. Thus, the feed rod 15 pushes the opening/closing door 6 open against the bias force of the kick spring 33 (shown in FIG. 1). The push-opened opening/closing door 6 is held in an open state by abutting against the periphery of the feed rod 15 that further keeps moving forward. Furthermore, the nut 7 to be fed next, which is placed in the supply opening 31 of the block 4, abuts against the outer periphery of the feed rod 15 so as to be blocked from entering the nut holding chamber 30.

Simultaneously, the air in the air chamber 3a inside the rod holder 3 is pressurized in conjunction with the forward movement of the feed rod 15. The pressurized air is taken in the air inlet 21 that is open at the feed rod 15 and then blown out of the air outlet 20 at the front end of the feed rod 15 through the air passage 22. This air is blown out of the air outlet 20 toward the bottom surface of the nut 7 as schematically shown by the arrows in FIG. 5. The nut 7 is pressed, by the pressure of this air, against the shoulder between the small-diameter section 16a and the large-diameter section 16b of the nut holding part 16 of the feed rod 15, and thereby held thereon.

Figure 6:
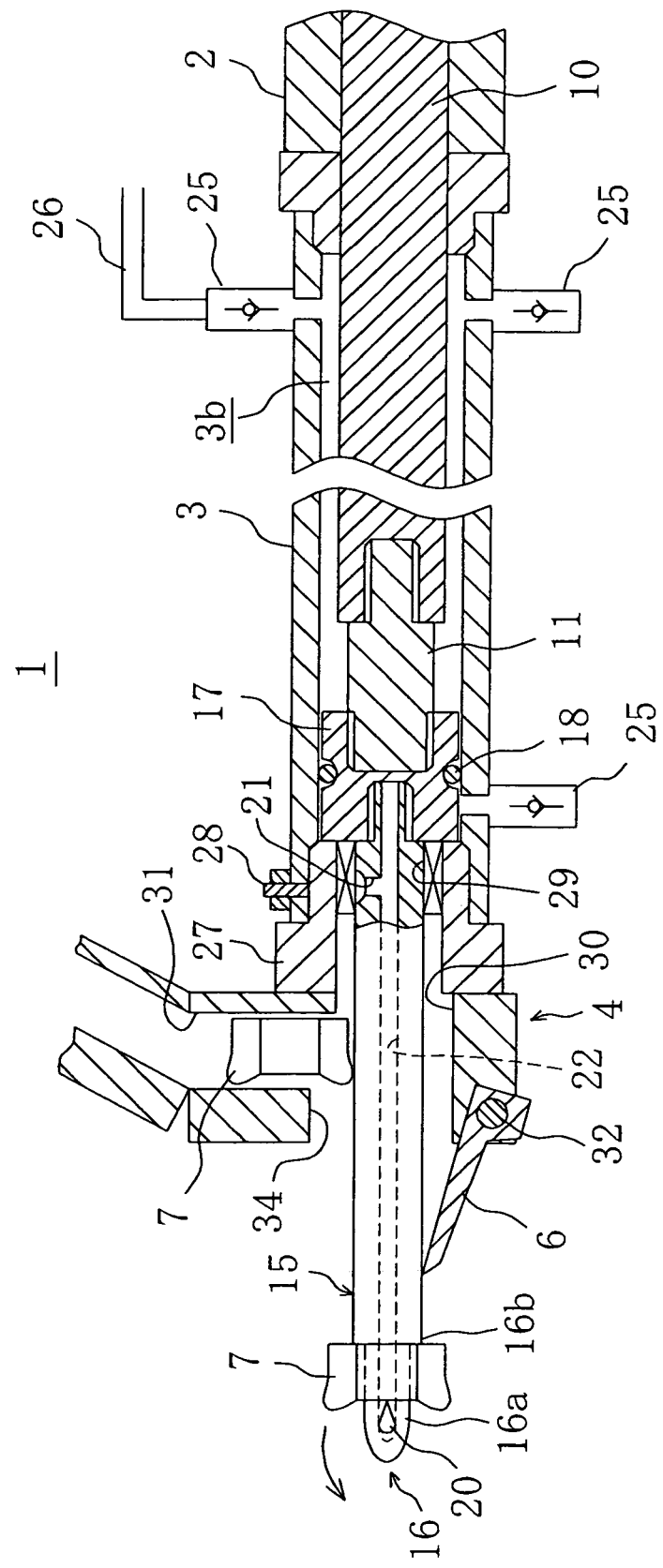
FIG. 6 is a cross-sectional view showing completion of operation of the nut feeder according to the embodiment of the present invention.

Then, as shown in FIG. 6, the drive rod 10 is further moved forward so that the nut 7 is positioned in the nut feeding position of unshown nut resistance welding equipment. At this time, the air inlet 21 of the feed rod 15 is blocked by the bush 29 inserted in the rod guide 27. This stops air from blowing out of the air outlet 20. The nut 7 is thereby fed from the nut holding part 16 located at the front end of the feed rod 15 to an unshown positioning pin provided in the nut feeding position of the nut resistance welding equipment.

Although in this embodiment air is stopped from blowing out by blocking the air inlet 21 using the bush 29, this is not restrictive. For example, even when the nut feeder is configured such that the air inlet 21 is not blocked by the bush 29 even in the extension of the drive rod 10 to the nut feeding position, it could stop air from blowing out of the air outlet 20 by putting the feed rod 15 on standby in the nut feeding position for a predetermined period.

After the nut 7 is fed to the nut resistance welding equipment, the drive rod 10 is retracted to return the feed rod 15 to the initial position located inside the rod holder 3. Thus, the opening/closing door 6, which has been kept open by the abutment against the outer periphery of the feed rod 15, is closed by the bias force of the kick spring 33 to block the delivery opening 34 of the block 4. Then, the next nut 7, which has been blocked from entering through the supply opening 31 into the holding chamber 30 by abutment against the outer periphery of the feed rod 15, enters the nut holding chamber 30.

Furthermore, in conjunction with the backward movement of the feed rod 15, the air in the air blow chamber 3b inside the rod holder 3 is blown out of the pressure-regulating valve 25 at the back end of the rod holder 3 through the air blow pipe 26 to the site where the nut is to be welded, by using the unshown air blower. The air blow can remove spatters or the like that have been produced in the nut welding. This eliminates the need for separately preparing air blow piping to remove the spatters and is advantageous in reducing the cost of spending on equipment and saving energy.

According to the above-described nut feeding method according to the present invention, the air in the air chamber 3a defined in the rod holder 3 is blown out of the air outlet 20 through the air inlet 21 and the air passage 22 by the forward movement of the feed rod 15. Therefore, the pressure of this air allows the nut 7 to be held on the feed rod 15. This eliminates the need for externally supplying air by the air compressor or the like, resulting in no need to provide the air compressor or air piping in the factory. This makes it possible to save energy and reduce noises and is also advantageous in reducing the cost of spending on equipment for the factory. Furthermore, the nut 7 can be prevented from accidentally dropping off the feed rod 15 until it reaches the nut feeding position.

Furthermore, when the nut 7 is positioned in the nut feeding position, the air inlet 21 of the feed rod 15 is blocked by the bush 29. Therefore, stop means, such as a sensor and a switch, need not be separately provided for stopping air from blowing out. Therefore, a nut feeder can be constructed with a simple mechanism. This is advantageous in reducing the cost of spending on equipment.

What is claimed is:

1. A nut feeder comprising:
   a cylindrical rod holder;
   a rod inserted into the rod holder and including at its front end a nut holding part insertable into the hole of a nut, said rod being constructed so as to be driven into forward and backward movement by an actuator;
   a nut stopper, provided at the front end of the rod holder, for supporting the nut coaxially with the rod and for permitting the forward feed of the nut when the nut holding part is inserted into the nut hole and subsequently pushes forward the nut stopper by the forward movement of the rod;
   a piston provided on the rod to slide on an inner periphery of the rod holder; and
   a seal for airtightly inserting a part of the rod located forward of the piston into the rod holder, said seal being provided on the inner periphery of the front end of the rod holder,
   wherein in the rod holder, an air chamber is formed which is defined at the front and back ends by the seal and the piston, respectively, and changes the air chamber's volume in accordance with the forward/backward movement of the rod,
   the rod is formed with an air outlet provided at the front end section of the nut holding part to blow air to the nut carried on the nut holding part against dropping off of the nut from the nut holding part, an air inlet provided backward of the nut holding part to connect with the air chamber, and an air passage connecting the air outlet and the air inlet, and
   the forward movement of the rod allows the air in the air chamber to be pressurized by the piston to blow the pressurized air to the nut carried on the nut holding part, and then allows the nut to be fed as being held on the nut holding part by the air blown to the nut.

2. The nut feeder of claim 1, wherein:

the rod is composed of a drive rod driven by the actuator and a feed rod connected to the front end of the drive rod;

the nut holding part is provided at the front end of the feed rod; the piston is provided on the feed rod or between the feed rod and the drive rod;

a block including a nut holding chamber connected to the inside of the rod holder is provided at the front end of the rod holder;

the block is formed with a supply opening for supplying nuts into the nut holding chamber and a delivery opening for delivering each said nut from the nut holding chamber; and the nut stopper is provided on the block to normally close the delivery opening and, when pushed by the feed rod, open the delivery opening and permit the nut to be fed.

3. The nut feeder of claim 1 or 2, wherein the nut holding part of the rod includes a small-diameter section located at the front end thereof and insertable into the hole of a nut and a large-diameter section connecting to the small-diameter section and having a larger diameter than the hole of a nut, and is formed with the air outlet at the front end of the small-diameter section, and the nut feeder is constructed to blow air to a nut carried on the nut holding part through the air outlet so that the nut is pressed against a shoulder between the small-diameter section and the large-diameter section.

4. The nut feeder of claim 1 or 2, wherein when the nut held on the nut holding part is fed to a predetermined nut feeding position by the forward movement of the rod, the air inlet is placed so as to be blocked by the seal to stop air from blowing out of the air outlet.

* * * * *

UNITED STATES PATENT AND TRADEMARK OFFICE
CERTIFICATE OF CORRECTION

PATENT NO. : 7,559,435 B2 Page 1 of 1
APPLICATION NO. : 10/879748
DATED : July 14, 2009
INVENTOR(S) : Masaaki Miura, Kouji Sakota and Seiji Miura It is certified that error appears in the above-identified patent and that said Letters Patent is hereby corrected as shown below:

On the title page, items (75) and (56) should read as follows:

(75) Inventors: Masaaki Miura, Hiroshima (JP); Kouji Sakota, Hiroshima (JP); Seiji Miura, Hiroshima (JP)

(56) References Cited

U.S. PATENT DOCUMENTS 5,895,584 A * 4/1999 Sakota.....................219/86.24
6,874,655 B2* 4/2005 Aoyama et al. ........221/213

FOREIGN PATENT DOCUMENTS

JP           10-43870       2/1982
JP          2002-321064     11/2002

OTHER PUBLICATIONS

"Notice of Reasons for Restrictions" No. 2004-205102 dated Oct. 2, 2007 from the Japanese Patent Office (with Translation).
Toshiro Kanazawa, "Notice of Reasons for Rejection", JP2004-205102, Oct. 12, 2007

Signed and Sealed this

Twenty-third Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,559,435 B2  Page 1 of 1
APPLICATION NO. : 10/879748
DATED : July 14, 2009
INVENTOR(S) : Masaaki Miura, Kouji Sakota and Seiji Miura It is certified that error appears in the above-identified patent and that said Letters Patent is hereby corrected as shown below:

On the title page, items (75) and (56) should read as follows:

(75) Inventors: Masaaki Miura, Hiroshima (JP); Kouji Sakota, Hiroshima (JP); Seiji Miura, Hiroshima (JP)

(56) References Cited

U.S. PATENT DOCUMENTS 5,895,584 A * 4/1999 Sakota.....................219/86.24
6,874,655 B2* 4/2005 Aoyama et al. ........221/213

FOREIGN PATENT DOCUMENTS

| JP | 57007825 | 2/1982 |
| JP | 10-43870 | 2/1982 |
| JP | 2002-321064 | 11/2002 |

OTHER PUBLICATIONS

"Notice of Reasons for Restrictions" No. 2004-205102 dated Oct. 2, 2007 from the Japanese Patent Office (with Translation).
Toshiro Kanazawa, "Notice of Reasons for Rejection", JP2004-205102, Oct. 12, 2007

This certificate supersedes the Certificate of Correction issued February 23, 2010.

Signed and Sealed this

Seventeenth Day of August, 2010

David J. Kappos
*Director of the United States Patent and Trademark Office*